United States Patent
Singer et al.

(10) Patent No.: US 11,137,531 B2
(45) Date of Patent: Oct. 5, 2021

(54) OPTICAL TRANSMISSION ASSEMBLY FOR TRANSMITTING A SOURCE IMAGE

(71) Applicant: tooz technologies GmbH, Aalen (DE)

(72) Inventors: Wolfgang Singer, Aalen (DE); Holger Muenz, Aalen (DE)

(73) Assignee: tooz technologies GmbH, Aalen (DE)

( * ) Notice: Subject to any disclaimer, the term of this patent is extended or adjusted under 35 U.S.C. 154(b) by 0 days.

(21) Appl. No.: 16/651,309

(22) PCT Filed: Sep. 12, 2018

(86) PCT No.: PCT/EP2018/074610
§ 371 (c)(1),
(2) Date: Mar. 26, 2020

(87) PCT Pub. No.: WO2019/063291
PCT Pub. Date: Apr. 4, 2019

(65) Prior Publication Data
US 2020/0271847 A1    Aug. 27, 2020

(30) Foreign Application Priority Data
Sep. 26, 2017   (DE) .......................... 102017122353.3

(51) Int. Cl.
*G02B 6/00*    (2006.01)
*F21V 8/00*    (2006.01)
*G02B 27/01*   (2006.01)

(52) U.S. Cl.
CPC ......... *G02B 6/0016* (2013.01); *G02B 6/0038* (2013.01); *G02B 27/0172* (2013.01)

(58) Field of Classification Search
CPC . G02B 6/0016; G02B 6/0038; G02B 27/0172
(Continued)

(56) References Cited

U.S. PATENT DOCUMENTS 5,276,745 A  * 1/1994 Revelli, Jr. .......... G02B 6/1245
                                               369/44.12
6,487,016 B1 * 11/2002 Shiono ................... G11B 7/123
                                               359/566
(Continued)

FOREIGN PATENT DOCUMENTS

WO    2016130509 A1    8/2016
WO    2017102795 A1    6/2017

OTHER PUBLICATIONS

The International Search Report and Written Opinion rendered by the International Searching Authority for PCT/EP2018/074610, dated Dec. 5, 2018, 22 pages.

*Primary Examiner* — Jerry M Blevins
(74) *Attorney, Agent, or Firm* — Skaar Ulbrich Macari, P.A.

(57) ABSTRACT

An optical transmission assembly for transmitting a source image includes a waveguide assembly, an incoupling assembly for coupling light emitted from the source image into the waveguide assembly, and an outcoupling assembly for coupling the light guided in the waveguide assembly out of the waveguide assembly. The light emitted from the source image and coupled into the waveguide assembly can be propagated between the incoupling assembly and the outcoupling assembly in the waveguide assembly by means of a total reflection. The incoupling assembly has at least one diffractive incoupling grating which is inclined by an angle (α) ranging from 20° to 60° relative to a normal of a boundary surface of the waveguide assembly, and/or the outcoupling assembly has at least one diffractive outcoupling grating which is inclined by an angle (α) ranging from 20° to 60° relative to a normal of a boundary surface of the waveguide assembly.

11 Claims, 6 Drawing Sheets

(58) Field of Classification Search
USPC ............................................................ 385/37
See application file for complete search history.

(56) References Cited

U.S. PATENT DOCUMENTS

| | | | |
|---|---|---|---|
| 2014/0232651 A1* | 8/2014 | Kress ...................... | G06F 3/013 345/158 |
| 2015/0125109 A1 | 5/2015 | Robbins et al. | |
| 2016/0202423 A1* | 7/2016 | Li .......................... | G02B 6/124 385/11 |
| 2016/0370693 A1 | 12/2016 | Watanabe | |
| 2017/0097507 A1 | 4/2017 | Yeoh et al. | |

\* cited by examiner

OPTICAL TRANSMISSION ASSEMBLY FOR TRANSMITTING A SOURCE IMAGE

PRIORITY

This application claims the priority of German patent application DE 10 2017 122 353.3, filed Sep. 26, 2017, which is hereby incorporated herein by reference in its entirety.

FIELD

The invention relates to an optical transmission arrangement for transmitting a source image, comprising a light guide arrangement, comprising an input coupling arrangement for coupling light emanating from the source image into the light guide arrangement, and comprising an output coupling arrangement for coupling the light guided in the light guide arrangement out of the light guide arrangement, wherein the light emanating from the source image and coupled into the light guide arrangement can propagate in the light guide arrangement between the input coupling arrangement and the output coupling arrangement by way of total-internal reflection.

BACKGROUND

An optical transmission arrangement of the aforementioned type is known from WO 2017/102795 A1.

An optical transmission arrangement for transmitting a source image is used, for example, in a display system, such as an HUD (head-up display) or HMD (head-mounted display). An HUD and an HMD are display systems in which a source image is projected into the user's visual field with magnification of the exit pupil. In this case, the source image can be for example the image of a display of a vehicle instrument, of a cellular phone, of a games console, of a computer or the like. HMDs are used nowadays in aircraft and motor vehicles, for example, in order to project information, e.g., navigation information, for the pilot or driver into their visual field, without the pilot or driver having to divert their viewing direction from the straight-ahead direction. An HMD, in contrast to an HUD, is worn on the user's head. An HMD either presents images on a screen close to the eyes, or projects said images directly onto the retina. Other designations for an HMD include video glasses or smartglasses, helmet display or virtual reality helmet.

The principal components of such display systems are a display unit, which supplies the source image from a connected data source, and an optical transmission arrangement for transmitting the source image into a target image, which the user can observe.

One important characteristic variable of such display systems is the field of view (FOV). The field of view of such display systems should be of a magnitude such that the entire source image is transmitted into the target image. The field of view is the difference between the maximum and minimum angles, in each case measured from the center of the image to the mutually opposite image edges in a horizontal dimension (horizontal field of view) and in a vertical dimension (vertical field of view). In the present description, reference is made only to the field of view in one dimension for reasons of simplicity.

The optical transmission arrangement of such display system has a light guide arrangement made of an optically transparent material as a constituent part, light being guided in said light guide arrangement by way of total-internal reflection at optical interfaces of the optically denser material of the light guide arrangement to an optically thinner material, usually air. Furthermore, the optical transmission arrangement comprises an optical input coupling arrangement that can be used to couple the light emanating from the source image into the light guide arrangement and an output coupling arrangement that can be used to couple the light guided in the light guide arrangement out of the light guide arrangement such that the light can enter one or both eyes of the user.

The field of view was found to have unwanted restrictions in the case of optical transmission arrangements with the above-described structure, i.e., the entire source image or, expressed differently, the entire field angle spectrum of the light emanating from the source image cannot be transmitted by the optical transmission arrangement. Edge regions may be absent in the transmitted image in the case of relatively large source images, for example in the 16:9 format that is customary nowadays.

In general, the field of view is small in the case of optical transmission arrangements having the above-described structure. By contrast, in the case of HMDs, in particular, there is the desire for a field of view that is as large as possible and significantly greater than 20°, preferably greater than 40°.

WO 2017/102795 A1, cited at the outset, suggests that, for the purposes of solving the aforementioned problem, the field angle spectrum of the light emanating from the source image is split into a plurality of field angle portions prior to the coupling into the light guide arrangement, said field angle portions are transmitted individually and said field angle portions are recombined to form the entire field angle spectrum by way of the output coupling arrangement. A disadvantage here is that the light guide arrangement requires a plurality of light guides and/or a plurality of input coupling arrangements and output coupling arrangements. Disadvantageously, this leads to a complex structure; in particular, a stacked arrangement of a plurality of light guides leads to a transmission arrangement with an increased material thickness in the case of smartglasses, which is disadvantageous when integrating the transmission arrangement into a spectacle lens, for example.

SUMMARY

The invention is based on the object of developing an optical transmission arrangement of the type set forth at the outset, to the effect of avoiding the aforementioned disadvantages so that, in particular, a large field of view is obtained with, at the same time, a less complex structure of the optical transmission arrangement.

According to certain embodiments of the invention, this object is achieved in view of the optical transmission arrangement cited at the outset by virtue of the input coupling arrangement having at least one diffractive input coupling grating, which is inclined at an angle in relation to a normal of an interface of the light guide arrangement, said angle ranging from 20° to 60°, and/or by virtue of the output coupling arrangement having at least one diffractive output coupling grating, which is inclined at an angle in relation to a normal of an interface of the light guide arrangement, said angle ranging from 20° to 60°.

In the optical transmission arrangement known from the prior art, the input coupling grating and/or output coupling grating are always disposed with an orientation perpendicular to the normal of an interface of the light guide arrangement. By contrast, the present invention departs from this concept and proposes to arrange the at least one input coupling grating and/or the at least one output coupling grating, which is inclined at an angle in relation to the normal of an interface of the light guide arrangement, the inclination ranging between 20° and 60° with respect to the normal. Expressed differently, the at least one input coupling grating and/or the at least one output coupling grating has been set up in steep fashion between the interfaces of the light guide arrangement.

Using this arrangement of the at least one input coupling grating and/or of the at least one output coupling grating with a pronounced inclination with respect to the interface, it is possible, using only one light guide, to transmit fields of view of up to 80° in a material of the light guide arrangement, which has a refractive index of less than 1.6, as will be described in more detail below. Preferably, both the at least one input coupling grating and the at least one output coupling grating have an inclined arrangement, or at least the at least one output coupling grating has an inclined arrangement. Here, the diffraction at the input coupling grating and/or at the output coupling grating is preferably implemented in the pronounced conical direction. Diffraction is strongly non-linear at large diffraction angles and it is consequently possible to transmit greater field angle spectra.

The light guide arrangement is preferably planar. It should be noted that a "planar" light guide arrangement is understood to mean a light guide arrangement in which the opposing separation surfaces, at which the light propagates in the light guide arrangement by way of total-internal reflection, extend at least approximately parallel to one another. Overall, a planar light guide arrangement can be strictly straight or else be curved as a whole, as described in the document cited at the outset.

In one embodiment, the at least one input coupling grating and/or the at least one output coupling grating are planar diffraction gratings.

The at least one input coupling grating and/or the at least one output coupling grating can be embodied as a transmission grating. However, a configuration of the at least one input coupling grating and/or of the at least one output coupling grating as a reflection grating is also conceivable.

Preferably, the at least one input coupling grating and/or the at least one output coupling grating is inclined away from the normal in the direction of propagation of the light in the light guide arrangement.

In a further embodiment, the at least one input coupling grating and/or the at least one output coupling grating is inclined at an angle which equals the critical angle of total-internal reflection in the light guide arrangement, optionally plus an angle in an angle range of at most 15°, preferably of at most 10°.

In this configuration, the at least one input coupling grating and/or the at least one output coupling grating is disposed virtually perpendicular to the critical angle of the total-internal reflection, with slightly larger inclination angles being preferred, for example an angle that is greater than the critical angle of the total-internal reflection by up to 15°, preferably by approximately 5° to approximately 10°. By way of example, the critical angle of the total-internal reflection in a light guide arrangement made of polycarbonate, which has a refractive index of n=1.588, is approximately 39°, and so the at least one input coupling grating and/or the at least one output coupling grating can be inclined in relation to the normal of the interfaces of the light guide arrangement, for example by approximately 43° to 50°. Here, the light guided in the light guide arrangement is diffracted at a pronounced conical angle, wherein the angle spectrum guided in the light guide is greatly increased during output coupling if at least the output coupling grating is inclined in the manner described above.

If the output coupling grating is disposed with such an inclination, the output-coupled field angle range when coupling the light out of the light guide arrangement is increased yet again, and so fields of view of up to 80° in one dimension are achievable.

In one embodiment, the at least one input coupling grating and/or the at least one output coupling grating is disposed with an approximately perpendicular orientation with respect to a central light ray of an overall light beam guided in the light guide arrangement, as seen in the direction of propagation of the light in the light guide arrangement.

According to this measure, the at least one output coupling grating is inclined against the direction of propagation, to be precise in such a way that the light beam incident on the at least one output coupling grating is approximately centered around the grating normal, contributing to an increase in the output-coupled angle spectrum.

In one embodiment, the at least one output coupling grating is a blazed grating. A blazed grating is a grating in which the diffraction efficiency in a certain order of diffraction is at a maximum while the diffraction efficiency in the other orders of diffraction is minimal or negligibly small.

As already mentioned above, the at least one input coupling grating and the at least one output coupling grating are inclined, to be precise with an inclination angle in a range that was already described above.

Here, the at least one input coupling grating and the at least one output coupling grating are preferably inclined by the same angle.

Further preferably, the input coupling arrangement has a plurality of input coupling gratings, the input coupling gratings being inclined.

Here, the plurality of input coupling gratings can be disposed in succession in the direction of propagation of the light in the light guide arrangement.

It is likewise preferable for the output coupling arrangement to have a plurality of output coupling gratings, the output coupling gratings being inclined.

The output coupling gratings, too, can be disposed in succession as seen in the direction of propagation of the light in the light guide arrangement.

In the two aforementioned configurations, the input coupling gratings and the output coupling gratings are preferably embodied as transmission gratings. However, it is likewise conceivable for the input coupling arrangement and the output coupling arrangement to be embodied with gratings that operate in reflection.

The at least one input coupling grating and/or the at least one output coupling grating preferably have a grating period that approximately corresponds to a wavelength of the light propagating in the light guide arrangement, where the refractive index of the light guide arrangement has been taken into account.

For a light wavelength of, e.g., 550 nm in air, the wavelength of the same light in polycarbonate material is approximately 350 nm. In this example, the grating period of the at least one input coupling grating and/or the at least one output coupling grating is chosen accordingly at approximately 1.1-1.3 times the wavelength in the medium of approximately 350 nm.

Preferably, the at least one input coupling grating and/or the at least one output coupling grating is embedded in the light guide arrangement.

When the at least one input coupling grating and/or the at least one output coupling grating is embedded into the light guide arrangement, the light guide arrangement with the gratings can simply be produced by virtue of grating and carriers made of the material of the light guide arrangement being initially stacked in alternating fashion and connected, for example optically contact bonded, welded or adhesively bonded. Subsequently, the light guide arrangement with integrated input coupling and output coupling gratings can be produced from the stack by way of an oblique cut. In the process, the cut faces could optionally be polished or sealed by way of a thin termination plate.

For the purposes of transmitting a chromatically larger spectral range, the transmitted field angle range can be reduced since chromatic effects compensate during input and output coupling or there is the option of manufacturing color multiplexing with, e.g., two or three tilted grating stacks in a light guide for the three colors of red, green and blue (RGB).

A further advantage of the invention is that the principle of inclining the diffraction gratings in the region of the input coupling arrangement and/or in the region of the output coupling arrangement leads to a compact light guide arrangement and hence to a compact transmission arrangement.

Further advantages and features are evident from the following description of the attached drawing.

It goes without saying that the aforementioned features and those yet to be explained below can be used not only in the respectively specified combination but also in other combinations or on their own, without departing from the scope of the present invention.

BRIEF DESCRIPTION OF THE DRAWINGS

Exemplary embodiments of the invention are illustrated in the drawing and described in more detail below with reference thereto. In the figures.

Figure 1:
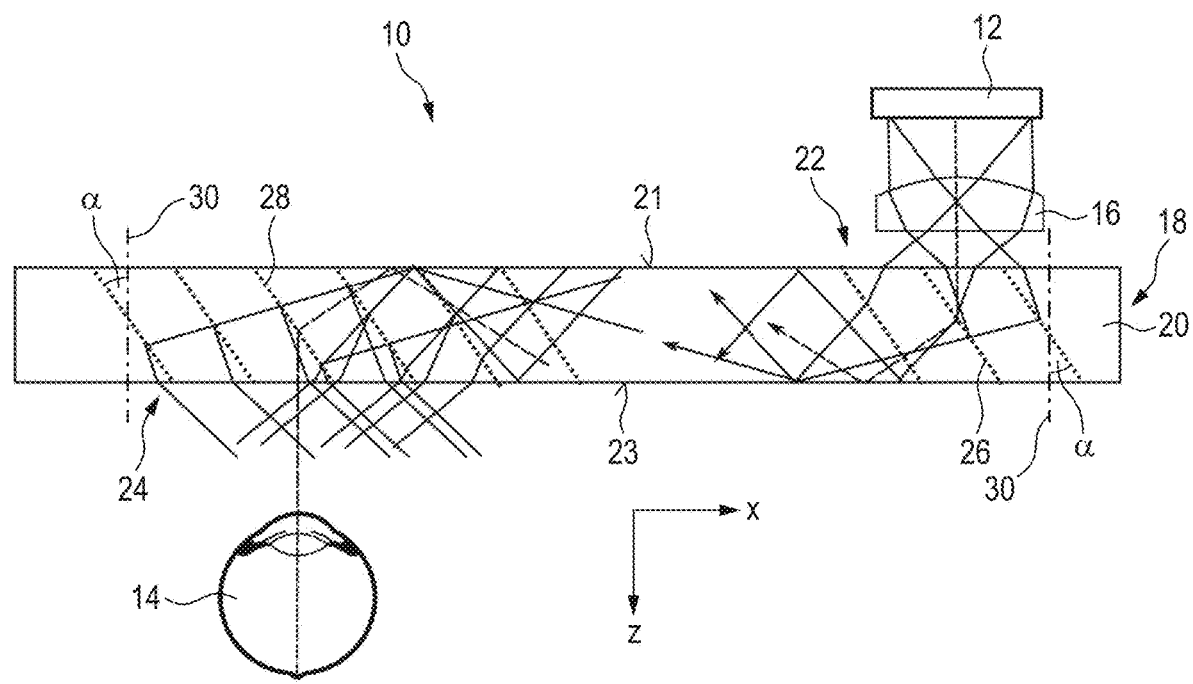
FIG. 1 schematically shows an optical transmission arrangement for transmitting a source image.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

FIG. 1 shows an optical transmission arrangement for transmitting a source image, said optical transmission arrangement being provided with the general reference sign 10. The source image is provided by a display 12 and transmitted to an eye 14 of an observer by means of the optical transmission arrangement 10. The object of this is to present the source image, provided by the display 12, with the greatest possible field of view (FOV) to the eye 14 of the observer.

An optical unit 16 is disposed downstream of the display 12, said optical unit directing light emanating from the display 12 onto a light guide arrangement 18 of the optical transmission arrangement in focused fashion or collimating said light. In the shown exemplary embodiment, the light guide arrangement 18 only has a single light guide 20, which is advantageous in view of a little complex and thin construction of the light guide arrangement 18.

For simplifying the further description of the optical transmission arrangement 10, a coordinate system with an x-axis and a z-axis is plotted in FIG. 1. Here, the X-direction denotes the direction in which the angle spectrum is restricted in the case of light guides with the output coupling as described in the prior art as a result of input and output coupling gratings disposed parallel to the surface. For simplifying the illustration and easing the understanding, the y-direction, i.e., the direction perpendicular to the vertex line as in FIG. 1, is not considered in more detail. The x-direction corresponds to the long dimension of the light guide 20; the z-direction corresponds to the viewing direction of the eye 14. If the arrangement in FIG. 1 is considered for the right eye in the case of a straight head posture, the y-axis can be, for example, the upward axis counter to the gravitational force. Input coupling in FIG. 1 is then implemented accordingly from the right-hand side. By contrast, if the y-direction is considered to be the horizontal direction, the input coupling for the right eye, for example, is implemented from above in the case of a straight head posture.

The light guide 20 comprises an input side interface 21 and an output side interface 23. The interfaces 21 and 23 represent optical interfaces of an optically denser medium of the light guide 22 and an optically thinner medium, e.g., air. By way of example, the light guide 20 may comprise polycarbonate or be manufactured completely therefrom. The light guide 20 is transparent to the light emitted by the display 20. By way of example, the light emitted by the visual field 12 may contain the entire visible spectrum.

The light guide arrangement 18 has a planar embodiment; i.e., the interfaces 21 and 23 of the light guide 20 extend parallel to one another. However, instead of the straight configuration of the light guide 20, as shown in FIG. 1, the latter may also have a curved embodiment, with the interfaces 21 and 23 then continuing to extend parallel to one another albeit along a curvature; this should likewise be understood to be planar. This may be advantageous for the purposes of integrating the light guide arrangement 18 in a spectacle lens.

In the light guide arrangement 18, the one light guide 20 in this case, the light emitted by the display 12 and coupled into the light guide arrangement 18 can propagate in the light guide 20 along the x-axis by way of total-internal reflection at the interfaces 21 and 23.

The optical transmission arrangement 10 comprises an input coupling arrangement 22 for the purposes of coupling the light emitted by the display 12 into the light guide arrangement 1. The input coupling arrangement 22 comprises one planar diffractive input coupling grating or, as shown here, a plurality of planar diffractive input coupling gratings, which are shown as dotted lines in FIG. 1 and one of which has been labeled by the reference sign 26. Overall, the transmission arrangement 10 in the shown exemplary embodiment comprises three diffractive input coupling gratings 26, this only being an example.

The transmission arrangement 10 moreover comprises an output coupling arrangement 24, which comprises one diffractive planar output coupling grating 28 or, as shown here, a plurality of diffractive planar output coupling gratings, which are visualized as dotted lines in FIG. 1 and one of which has been labeled by the reference sign 28. Overall, six output coupling gratings 28 are shown in FIG. 1, this only being an example. The output coupling gratings 28 are embodied as transmission gratings.

The input coupling arrangement 22 is located at one end of the light guide arrangement 18, which lies opposite the display 12, and the output coupling arrangement 24 is located at one end of the light guide arrangement 18, which lies opposite the eye 14.

Between the input coupling arrangement 22, i.e., between the input coupling gratings 26, and the output coupling arrangement 24, i.e., the output coupling gratings 28, the light emanating from the display 12 and coupled into the light guide arrangement 18 propagates by way of total-internal reflection.

In relation to a normal 30, which is the normal of both the interface 21 and the interface 23 in this case, the input coupling grating 26 is inclined by an angle $\alpha$ ranging from 20° to 60°. Preferably, the angle $\alpha$ is chosen to approximately equal the critical angle of the total-internal reflection or, more preferably, said angle is chosen slightly greater than said critical angle; by way of example, the angle $\alpha$ is approximately 2° to 15°, more preferably approximately 5° to 10°, greater than the critical angle of the total-internal reflection.

The same applies to the output coupling gratings 28, which are likewise inclined at an angle $\alpha$ within the aforementioned angular range in relation to the normal 30. Here, the inclination angle $\alpha$ of the output coupling gratings 28 can be chosen to be equal to the inclination angle $\alpha$ of the input coupling gratings 26; this is preferable if the output coupling gratings 28 and the input coupling gratings are optically equivalent.

By way of example, if the light guide 20 is manufactured from polycarbonate, the refractive index n of which equals 1.588, the critical angle of the total-internal reflection is approximately 39°. In this case, the input coupling grating 26 and the output coupling grating 28 are inclined in relation to the normal 30 by 43° to 50°, for example. The diffraction of the input coupling gratings 26 and/or the output coupling gratings 28 is in the pronounced conical direction, i.e., at large diffraction angles, and so the diffraction is nonlinear and greater field angle ranges of the source image light emitted by the display 12 can consequently be transmitted.

The input coupling gratings 26 and the output coupling gratings 28 preferably have a grating period that approximately corresponds to the wavelength of the light in the light guide 20. In the case of the aforementioned polycarbonate material with a refractive index n=1.588, light with a wavelength of 550 nm in air propagates in the light guide 20 with a wavelength of approximately 350 nm, and so the grating period is preferably chosen with approximately 1.1-1.3 times the wavelength in the medium of approximately 350 nm in this case.

As a result of the diffraction of the light guided in the light guide 20 at the output coupling arrangement 26 at a pronounced conical angle, the angle spectrum guided in the light guide 20 is greatly increased. Following the emergence from the light guide 20 at the output coupling arrangement 24, this angle is increased yet again by refraction, as a result of which field angles of up to 80° are achievable in one direction (the x-direction in this case).

Figure 2:
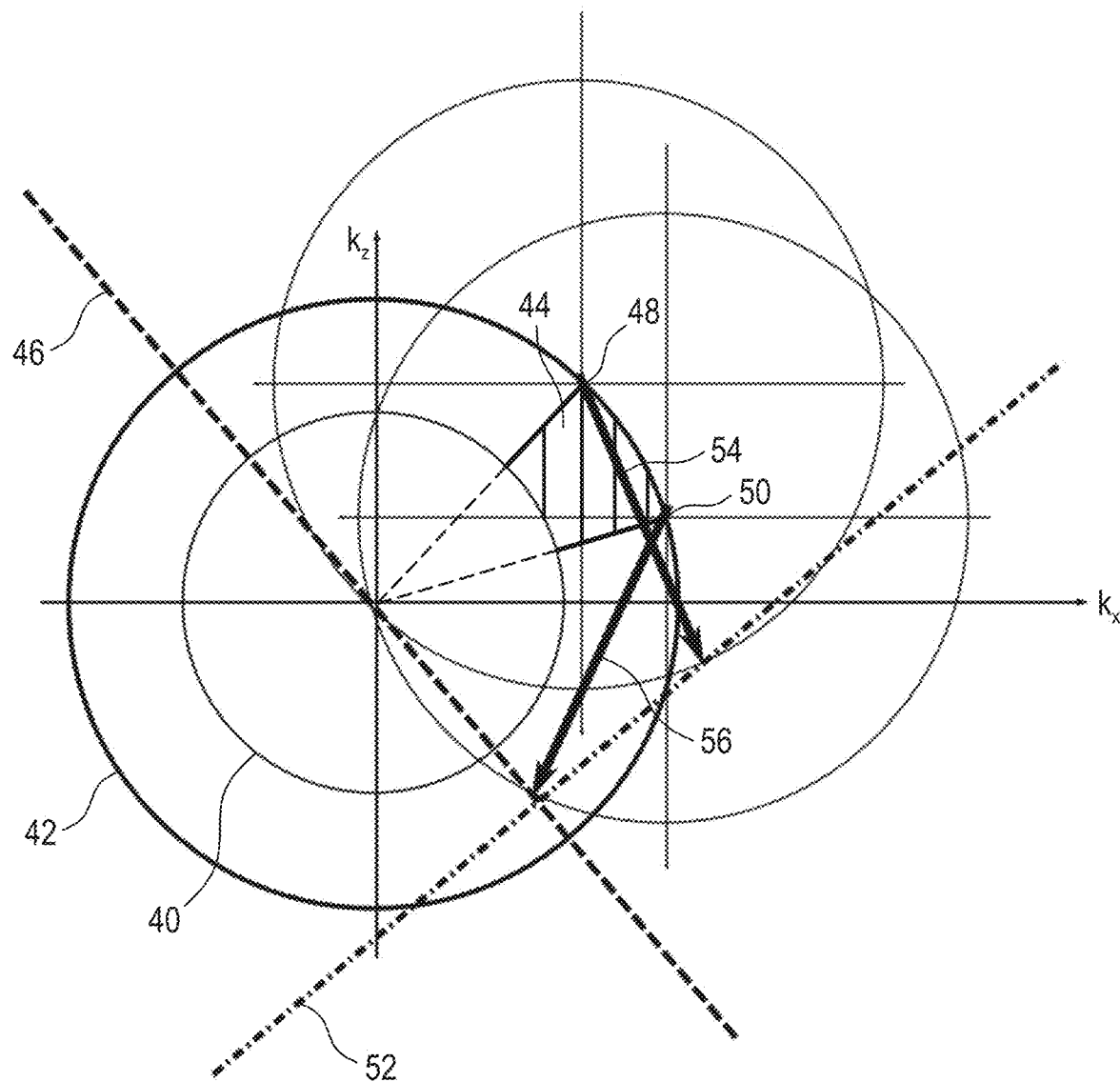
FIG. 2 shows a schematic sketch in k-space for elucidating the physical relationships in the case of an inclined grating.

FIG. 2 shows a corresponding Laue structure in k-space, i.e., in the spatial frequency or wave vector space. $k_z$ in this case denotes the z-component of the wave vector and $k_x$ denotes the x-component of the wave vector. The x- and z-direction correspond to the x-direction and z-direction, respectively, in FIG. 1.

In FIG. 2, the small circle 40 of radius $\pi/\lambda$ represents a section through the Ewald sphere of the light outside the light guide, e.g., the light guide 20 in FIG. 1, with a refractive index of 1. The large circle 42 of radius $n2\pi/\lambda$ represents a section through the Ewald sphere of the light within the light guide with a refractive index n. In order for the light to be guided by total-internal reflection in the light guide 20, the x-component of the k-vector in the light guide 20 must be greater than $2\pi/\lambda$. The angle range of possible propagation angles in the light guide is labeled by the reference sign 44 in FIG. 2 and illustrated by hatching, wherein a distance of approximately 5° from the critical angle of the total-internal reflection has been chosen.

Furthermore, a diffraction grating 46, which can, for example be one of the output coupling gratings 28 of FIG. 1, is plotted in FIG. 2. As emerges from FIG. 2, the diffraction grating 46 is inclined in relation to the $k_z$-axis, the latter corresponding to the normal 30 in FIG. 1, to be precise away from the normal in the direction of propagation of light in the light guide, as emerges from FIG. 2.

The hatched region 44 of the propagation-capable angles in the light guide 20 ranges from an angle 48, which approximately equals the critical angle of the total-internal reflection or is slightly smaller than the latter, to an angle 50, which represents a grazing propagation angle of 75° with respect to the normal 30. The grating 46 (more precisely, the normal thereof) has a greater inclination toward the $k_z$-axis by approximately 5° to 10° than the critical angle of the total-internal reflection.

A dash-dotted line 52 in FIG. 2 represents the frequency contributions of the diffraction grating 46 perpendicular to the diffraction grating 46. The grating period of the diffraction grating corresponds to the reciprocal of the shortest distance of the line 52 from the coordinate origin of the k-space.

The k-vectors 54 and 56 diffracted at the grating 46 are plotted in FIG. 2 for the two critical angles of the region 44, which k-vectors emerge from the points of intersection of the Ewald sphere 42 in the light guide 20 with the line 52 of the frequency contributions of the grating 46 (Laue condition).

Figure 3:
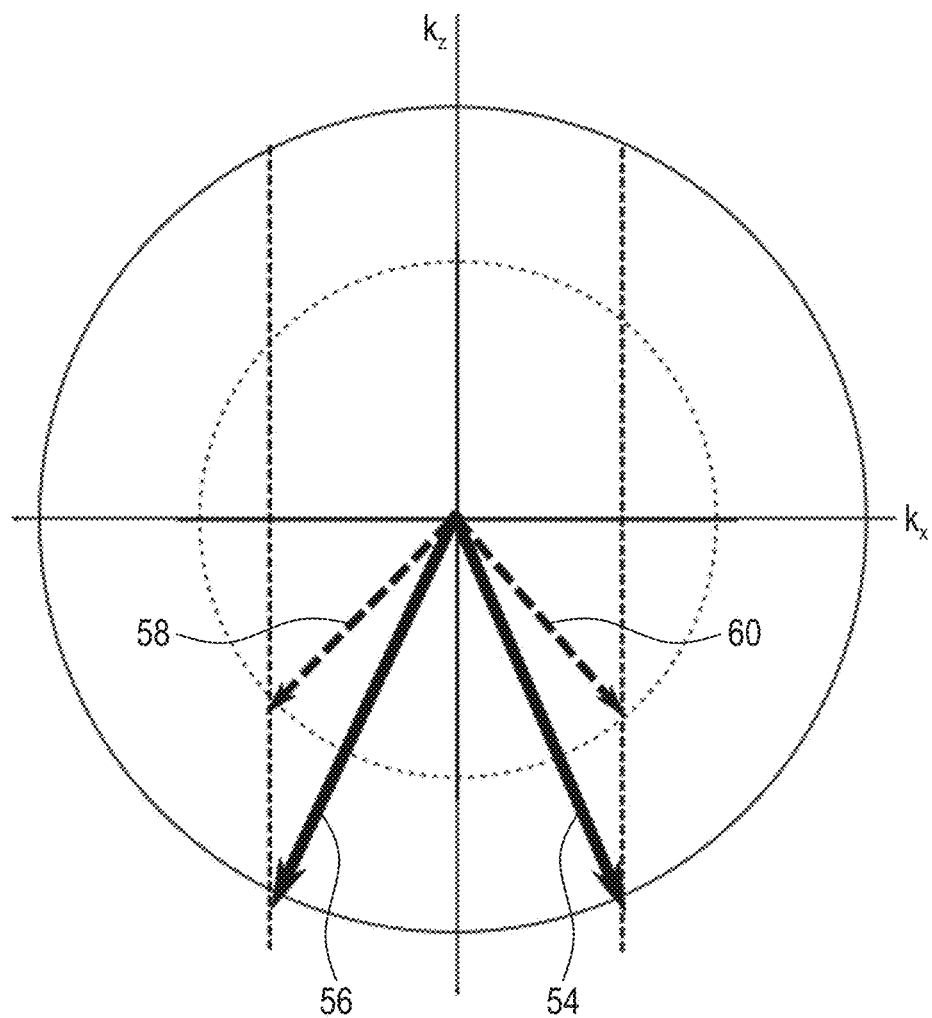
FIG. 3 shows a further schematic sketch in k-space for elucidating the transmittable field angles (field of view) in the case of a transmission arrangement with inclined gratings.

In FIG. 3, the vectors 54 and 56 are displaced in parallel in relation to FIG. 2, and so they emanate from the origin of the k-space. Furthermore, k-vectors 58 and 60 following the refraction of the light at the emergence from the interface 23 are plotted in FIG. 3. Consequently, it is evident that a field angle of up to 80° in one direction (the x-direction in this case) can be already transmitted in a light guide 20 made of a material such as polycarbonate with a refractive index of n=1.588, in contrast to a field angle of approximately 25° in the case of an arrangement of the output coupling gratings 28 parallel to the interfaces 21 and 23. The increased transmissible field angle range is consequently an upshot of the non-parallel arrangement of the gratings 28 in relation to the interfaces 21, 23 or the greater inclination of said gratings with respect to the interfaces 21, 23.

While this was described above for the conditions at the output coupling gratings 28, the same considerations and principles also apply to the input coupling gratings 26.

Figure 4:
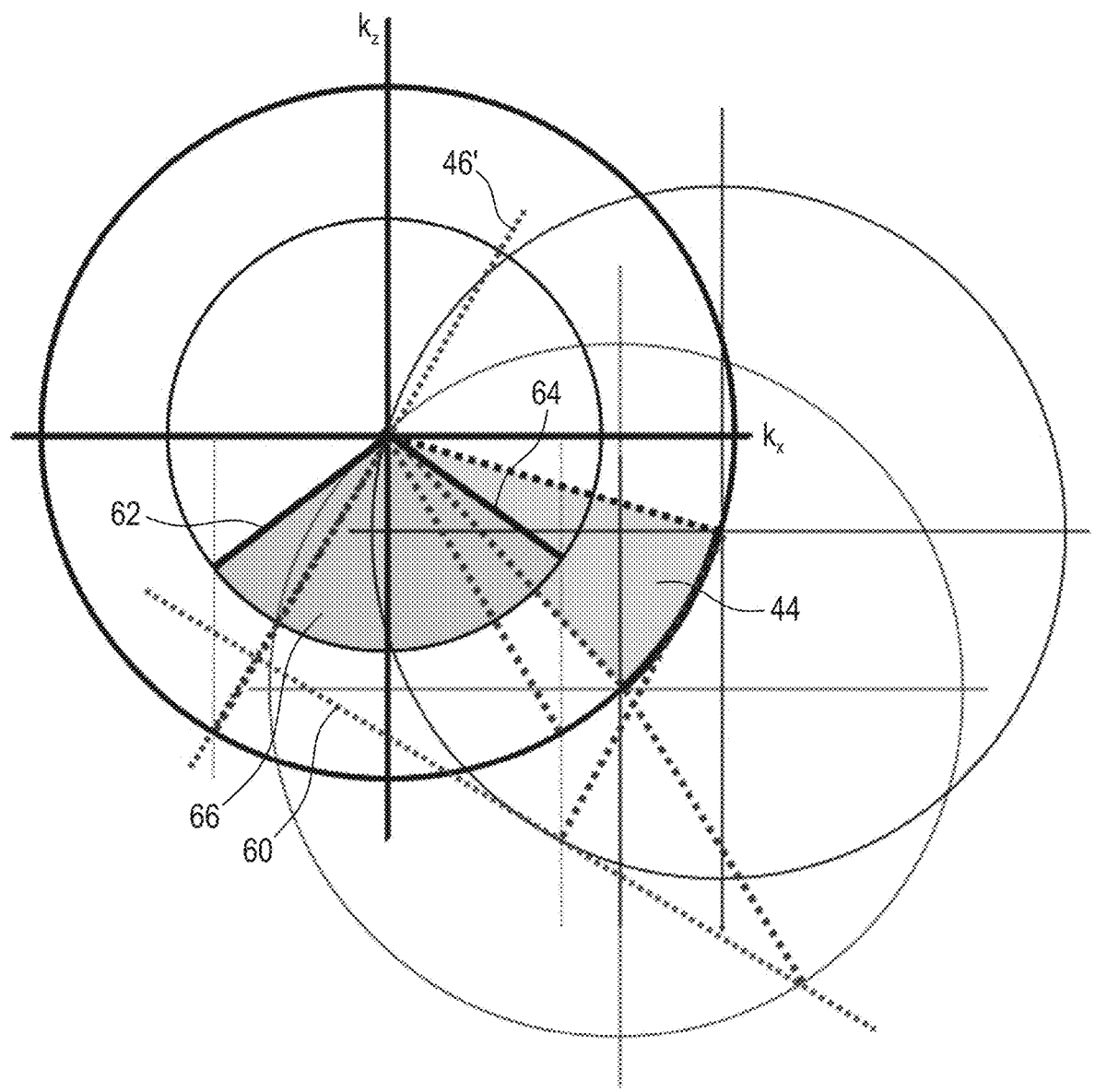
FIG. 4 shows an even further schematic sketch in k-space for elucidating the transmittable field angle range when gratings are inclined in reversed fashion with respect to the direction of propagation.
Figure 5:
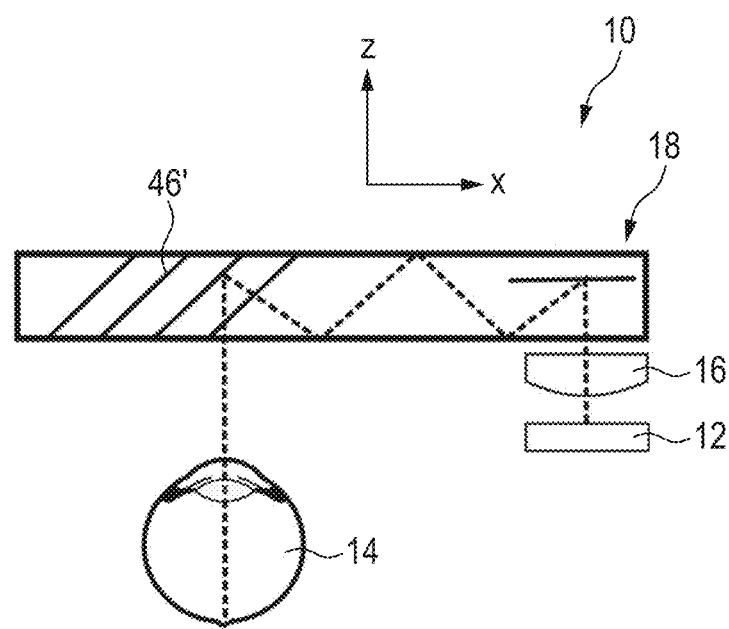
FIG. 5 shows an exemplary embodiment of a transmission arrangement, which operates according to the schematic sketch in FIG. 4.

Furthermore, as described with reference to FIG. 4, it is advantageous for the grating or gratings 46' of the output coupling arrangement to be arranged in such a way that the light beam (sector 44 (see also FIG. 2)) guided in the light guide, or a central light ray of the light beam, strikes the grating 46' in virtually perpendicular fashion and the grating 46' is embodied with a period of approximately 1.3λ (dotted line 16), as a result of which the output-coupled angle spectrum 66 (sector between lines 62 and 64) is increased to the maximum possible extent. In the case described above, the output coupling grating or gratings 46' are inclined counter to the direction of propagation of the light in the light guide, as shown in FIG. 5. Here, the output coupling gratings 46' can be partly transmissive and partly reflective, i.e., the output coupling gratings diffract the incident light partly in transmission and partly in reflection.

What emerges from the description above is that the field angle spectrum that is guidable in the light guide 20 can be greatly increased during the output coupling on account of the inclined output coupling gratings 28 or 46 or 46' and, optionally, the inclined input coupling gratings 26.

In FIG. 1, the input coupling gratings 26 and the output coupling gratings 28 are embedded in the light guide, light input coupling and light output coupling being implemented on opposite sides. Alternatively, input and output coupling can also be implemented on the same sides.

As a result of the output coupling with inclined gratings, the angle spectrum transmitted in the light guide is greatly extended, i.e., increased, in one direction (the critical direction in the light guide). In the exemplary embodiment as per FIG. 1, this is provided by a compensating compression or reduction in the angle spectrum by inclined input coupling gratings. Alternatively, as explained in FIG. 5, the compensating compression or reduction in the angle spectrum can also be provided electronically by a corresponding compression of the displayed content on the display 12, particularly for narrowband or virtually monochromatic light, and the input coupling can be implemented by way of known methods, for example gratings arranged parallel to the surface.

In place of a two-dimensional display, a scanning optical unit with, e.g., at least one pulsed laser light source can also be used as an alternative.

Figure 6:
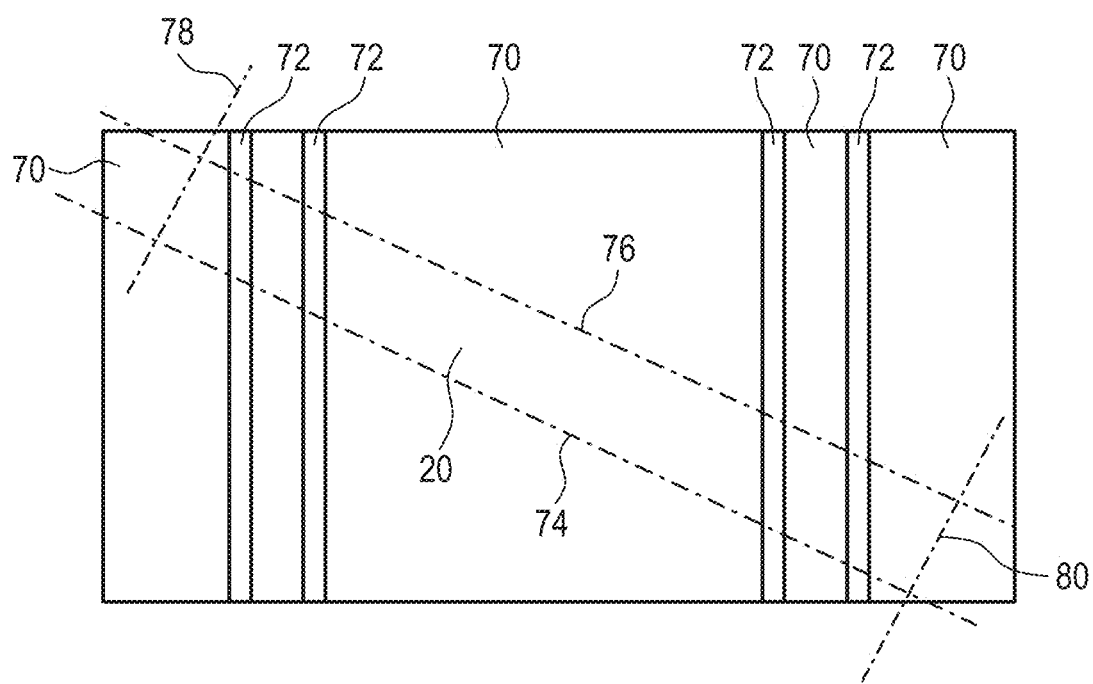
FIG. 6 shows a schematic sketch for elucidating a method for producing a light guide arrangement with inclined gratings.

The input coupling gratings 26 and the output coupling gratings 28 are embedded in the light guide in FIG. 1. FIG. 6 shows an example of how a light guide with inclined diffraction gratings embedded therein can be produced. Initially, plane gratings 72 are applied to plane carriers 70 in a layer or stack arrangement, wherein the individual elements 70 and 72 can be joined to one another, for example adhesively bonded or cemented using optical cement. Alternative joining processes are optical contact bonding or welding by means of ultrasound or binding agents. Subsequently, the light guide 20 with the inclined gratings embedded therein can be obtained from the stack by means of an oblique cut, which is represented here by two cut lines 74 and 76. Further cut lines 78 and 80 serve to straighten the ends of the light guide 20. The cut face or cut faces could optionally be polished or sealed by way of a thin termination plate.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. An optical transmission arrangement for transmitting a source image, comprising:
    a light guide arrangement, comprising
        an input coupling that couples light emanating from the source image into the light guide arrangement, and
        an output coupling that couples the light guided in the light guide arrangement out of the light guide arrangement,
        wherein the light emanating from the source image and coupled into the light guide arrangement propagates in the light guide arrangement between the input coupling and the output coupling via total-internal reflection,
    wherein each of the input coupling and the output coupling comprises a diffractive grating, wherein each of the diffractive gratings is inclined at an angle (α) in relation to a normal of an interface of the light guide arrangement, said angle ranging from 20° to 60°, and wherein the diffractive gratings of each of the input coupling and the output coupling are inclined by a same degree of the angle (α).

2. The transmission arrangement of claim 1, wherein the diffractive grating for at least one of the input coupling or the output coupling grating is inclined away from the normal in a direction of propagation of the light in the light guide arrangement.

3. The transmission arrangement of claim 1, wherein the diffractive grating for at least one of the input coupling or the output coupling grating is inclined away from the normal counter to a direction of propagation of the light in the light guide arrangement.

4. The transmission arrangement of claim 1, wherein the angle (α) equals a critical angle of total-internal reflection in the light guide arrangement.

5. The transmission arrangement of claim 1, wherein the angle (α) equals a critical angle of total-internal reflection in the light guide arrangement plus an additional angular amount of up to 15°.

6. The transmission arrangement of claim 1, wherein the angle (α) equals a critical angle of total-internal reflection in the light guide arrangement plus an additional angular amount of up to 10°.

7. The transmission arrangement of claim 1, wherein the diffractive grating for at least one of the input coupling or the output coupling grating is disposed with an approximately perpendicular orientation with respect to a central light ray of an overall light beam guided in the light guide arrangement, as seen in a direction of propagation of the light in the light guide arrangement.

8. The transmission arrangement of claim 1, wherein the output coupling comprises the diffractive grating in the form of a blazed grating.

9. The transmission arrangement of claim 1, wherein at least one of the input coupling or the output coupling comprises a plurality of inclined gratings.

10. The transmission arrangement of claim 1, wherein the diffractive grating for at least one of the input coupling or the output coupling grating has a grating period that approximately corresponds to a wavelength of the light propagating in the light guide arrangement, where the refractive index of the light guide arrangement has been taken into account.

11. The transmission arrangement of claim 1, wherein the diffractive grating for at least one of the input coupling or the output coupling grating is embedded in the light guide arrangement.

\* \* \* \* \*